(12) United States Patent
Hatasaki et al.

(10) Patent No.: US 8,103,721 B2
(45) Date of Patent: *Jan. 24, 2012

(54) COMPUTING SYSTEM AND METHOD OF CHANGING I/O CONFIGURATION THEREOF

(75) Inventors: Keisuke Hatasaki, Kawasaki (JP); Yoshifumi Takamoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/951,237

(22) Filed: Nov. 22, 2010

(65) Prior Publication Data
US 2011/0072080 A1   Mar. 24, 2011

Related U.S. Application Data

(63) Continuation of application No. 12/200,409, filed on Aug. 28, 2008, now Pat. No. 7,870,191.

(30) Foreign Application Priority Data

Jun. 19, 2008   (JP) .................................. 2008-160459

(51) Int. Cl.
*G06F 15/16* (2006.01)

(52) U.S. Cl. ........ 709/203; 709/201; 709/214; 709/219; 709/220; 709/223; 709/245; 709/226; 711/113; 711/118; 711/138; 711/139; 711/154; 711/112; 711/165; 711/161; 711/164

(58) Field of Classification Search .................. 709/203, 709/201, 217, 219, 220, 223
See application file for complete search history.

(56) References Cited

U.S. PATENT DOCUMENTS

| 7,516,201 | B2 | 4/2009 | Kovacs et al. | |
| 7,870,191 | B2 * | 1/2011 | Hatasaki et al. | 709/203 |
| 2009/0319604 | A1 * | 12/2009 | Hatasaki et al. | 709/203 |

* cited by examiner

*Primary Examiner* — Jude Jean Gilles
(74) *Attorney, Agent, or Firm* — Mattingly & Malur, PC

(57) ABSTRACT

A computing system includes: first and second I/O interfaces that are associated with a server; and an I/O management unit that connects the server with the first and second I/O interfaces. The I/O management unit includes: an I/O buffer; an I/O mapping unit that stores an access request of the server to the first I/O interface in the I/O buffer in response to a change start request of the first I/O interface associated with the server to the second I/O interface; an I/O changing unit that associates the second I/O interface with the server; and an I/O synchronizing unit that converts the access request stored in the I/O buffer into an access request to the second I/O interface, in response to the completion of the association by the I/O changing unit, and executes the converted access request.

20 Claims, 15 Drawing Sheets

| I/O INTERFACE | DEVICE IDENTIFIER | MMIO | INT |
|---|---|---|---|
| I/O 1 | B0 D0 F0 | 0x00000000_0x00000FFF | A |
| I/O 2 | B0 D0 F1 | 0x00001000_0x00001FFF | B |
| I/O 3 | B1 D1 F0 | 0x00004000_0x00004FFF | C |
| I/O 4 | B1 D2 F0 | 0x00008000_0x000080FF | D |
| I/O 5 | B2 D0 F0 | 0x00010000_0x0001FFFF | A |
| I/O 6 | B3 D1 F0 | 0x00020000_0x00020FFF | B |

| VIRTUAL SERVER | I/O INTERFACE | VIRTUAL DEVICE IDENTIFIER | VIRTUAL MMIO | VIRTUAL INT |
|---|---|---|---|---|
| 1 | I/O 1 | B0 D0 F0 | 0x00004000_0x00004FFF | A |
| 2 | I/O 2 | B0 D0 F0 | 0x00007000_0x00007FFF | A |
|   | I/O 3 | B0 D1 F0 | 0x00008000_0x00008FFF | B |
| 3 | I/O 3 | B1 D0 F0 | 0x00004000_0x00004FFF | C |
| 4 | I/O 4 | B1 D0 F1 | 0x00002000_0x000020FF | A |
|   | I/O 5 | B2 D0 F0 | 0x00010000_0x0001FFFF | D |
| 5 | I/O 4 | B0 D1 F1 | 0x00002000_0x000020FF | D |

Columns: 340, 341, 342, 343, 344

| VIRTUAL SERVER | CHANGE SOURCE I/O INTERFACE | CHANGE DESTINATION I/O INTERFACE |
|---|---|---|
| 1 | I/O 1 | I/O 6 |

Columns: 350, 351, 352

| NUMBER 360 | REQUEST AND RESPONSE VIRTUAL SERVER 361 | I/O INTERFACE 362 | REQUEST AND RESPONSE 363 |
|---|---|---|---|
| 1 | 1 | I/O 1 | Write xxx |
| 2 | 1 | I/O 1 | Reply yyy |
| 3 | 1 | I/O 6 | Write zzz |

| I/O | I/O TYPE | ID | CONNECTION DESTINATION |
|---|---|---|---|
| I/O 1 | FC-HBA | WWN1 | SAN1:LU1 |
| I/O 2 | NIC | MAC1 | NW1 |
| I/O 3 | FC-HBA | WWN2 | SAN2:LU2 |
| I/O 4 | NIC | MAC2 | NW2 |
| I/O 5 | FC-HBA | WWN3 | SAN3:LU3 |
| I/O 6 | FC-HBA | WWN4 | SAN1:LU4 |

| VIRTUAL SERVER | I/O INTERFACE |
|---|---|
| 1 | I/O 1 |
| 2 | I/O 2 |
|  | I/O 3 |
| 3 | I/O 3 |
| 4 | I/O 4 |
|  | I/O 5 |
| 5 | I/O 4 |

770　771

COMPUTING SYSTEM AND METHOD OF CHANGING I/O CONFIGURATION THEREOF

CROSS-REFERENCE

This is a continuation application of U.S. Ser. No. 12/200,409, filed Aug. 28, 2008 (now U.S. Pat. No. 7,870,191).

INCORPORATED BY REFERENCE

The present application claims priority from Japanese application 2008-160459 filed on Jun. 19, 2008, the contents of which are hereby incorporated by reference into this application.

BACKGROUND OF THE INVENTION

1. Field of the Invention

The present invention relates to a computing system, and more particularly, to a computing system capable of changing the mapping (correspondence) between a server and an I/O interface and a method of changing the I/O configuration thereof.

2. Description of the Related Art

A server of a computing system has I/O interfaces (for example, PCI devices) fixedly provided therein. However, it is preferable to flexibly change the allocations of the server and the I/O interfaces in order to flexibly operate the computing system.

A server virtualization technique has been proposed in order to implement flexible changes in the allocation. The server virtualization technique can associate a virtual server in the server with an I/O interface among plural I/O interfaces provided in the server.

SUMMARY OF THE INVENTION

In the above-mentioned method, when the I/O interface is changed while the virtual server is being operated, an error occurs in the process using the I/O interface, and the execution of the virtual server is interrupted. Therefore, in order to change the I/O interface allocated to the virtual server to another I/O interface, it is necessary to stop the virtual server to change the I/O interface, and then restart the virtual server. However, there is a problem in restarting the virtual server in that a continuous series of processes need to be executed from the beginning again, resulting in lowering the availability of the computing system.

An object of the invention is to change an I/O interface used by a server without restarting the server, that is, while continuously performing the process of the server, and to reduce the influence of the change in the I/O interface on tasks of a computing system.

According to an aspect of the invention, a computing system includes: first and second I/O interfaces that are associated with a server; and an I/O management unit that connects the server and the first and second I/O interfaces. The I/O management unit includes: an I/O buffer; an I/O mapping unit that stores an access request of the server to the first I/O interface in the I/O buffer in response to a change start request of the first I/O interface associated with the server to the second I/O interface; an I/O changing unit that associates the second I/O interface with the server; and an I/O synchronizing unit that converts the access request stored in the I/O buffer into an access request to the second I/O interface, in response to the completion of the association by the I/O changing unit, and executes the converted access request.

In the computing system according to the above-mentioned aspect, preferably, when the I/O changing unit cannot associate the server with the second I/O interface, the I/O synchronizing unit executes the access request to the first I/O interface that is stored in the I/O buffer.

Preferably, the computing system according to the above-mentioned aspect further includes a virtualization unit that manages the server, and the server is a virtual server.

In the computing system according to the above-mentioned aspect, preferably, the I/O management unit is included in the virtualization unit.

Preferably, the computing system according to the above-mentioned aspect further includes: a management server that issues the change start request using information identifying the server and the first and second I/O interfaces as parameters.

According to another aspect of the invention, there is provided an I/O management device that is connected to a server. The I/O management device includes: an I/O buffer; an I/O mapping unit that stores an access request of the server to a first I/O interface in the I/O buffer in response to a change start request of the first I/O interface associated with the server to a second I/O interface; an I/O changing unit that associates the second I/O interface with the server; and an I/O synchronizing unit that converts the access request stored in the I/O buffer into an access request to the second I/O interface, in response to the completion of the association by the I/O changing unit, and executes the converted access request.

According to still another aspect of the invention, there is provided a method of changing the I/O configuration of a computing system using an I/O management unit that has an I/O buffer and changes a first I/O interface associated with a server to a second I/O interface. The method includes: storing an access request of the server to the first I/O interface in the I/O buffer in response to a change start request of the first I/O interface associated with the server to the second I/O interface; associating the second I/O interface with the server; and converting the access request stored in the I/O buffer into an access request to the second I/O interface, in response to the completion of the association, and executing the converted access request.

According to the above-mentioned aspects of the invention, it is possible to change an I/O interface used by a server while continuously performing the process of the server.

BRIEF DESCRIPTION OF THE DRAWINGS

FIG. 4 is a diagram illustrating an example of an I/O mapping table;

FIG. 5 is a diagram illustrating an example of an I/O synchronization table;

FIG. 8 is a diagram illustrating an example of an I/O configuration table;

FIG. 9 is a diagram illustrating an example of a mapping management table;

DETAILED DESCRIPTION OF THE PREFERRED EMBODIMENTS

Hereinafter, exemplary embodiments of the present invention will be described.

First Embodiment

Figure 1:
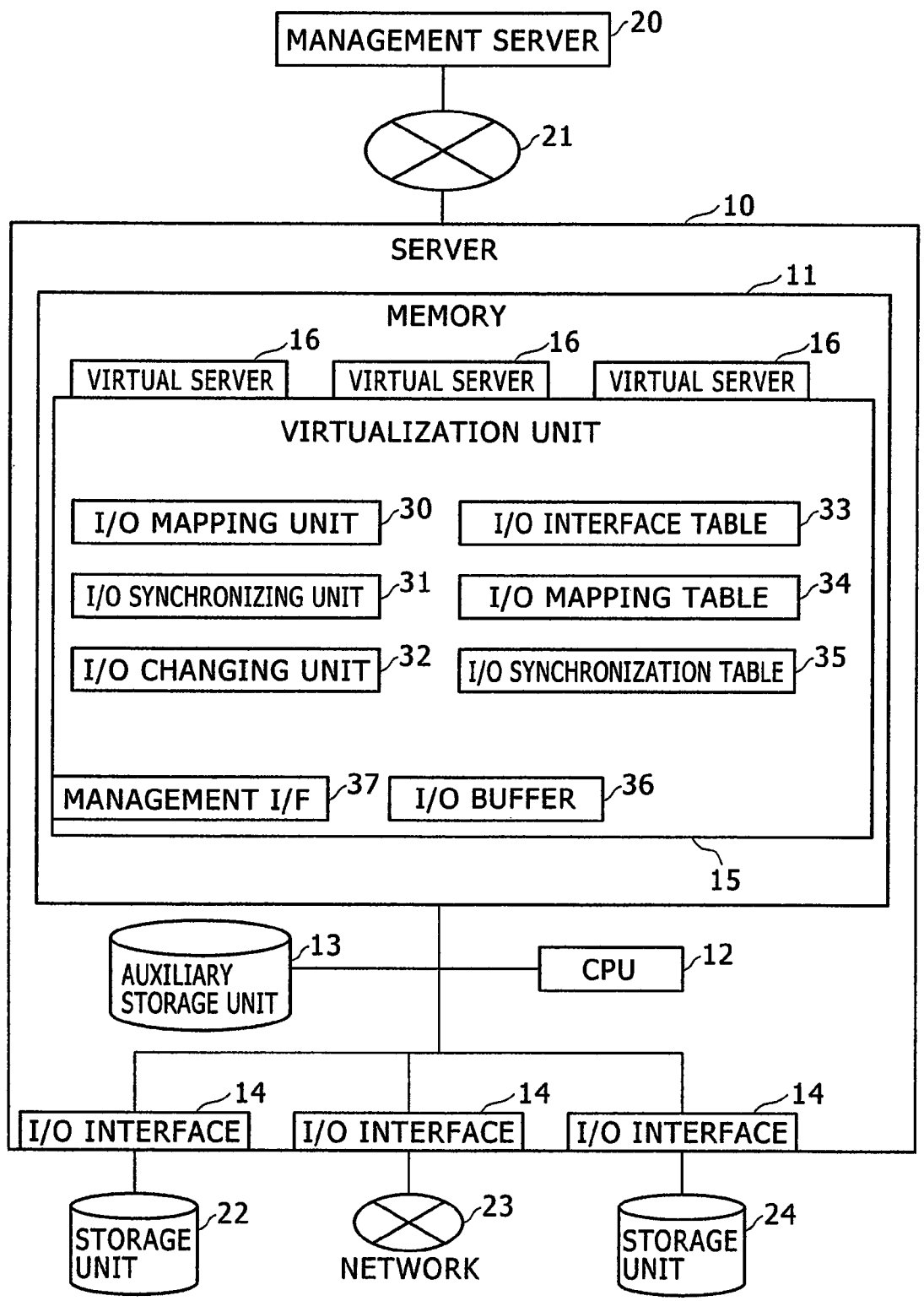
FIG. 1 is a diagram illustrating the structure of a computing system according to a first embodiment of the invention.

FIG. 1 is a diagram illustrating the structure of a computing system according to a first embodiment of the invention. The computing system according to this embodiment includes a management server 20, a server 10, and a network 21 that connects the servers. The server 10 includes a memory 11 having a virtualization unit 15 and virtual servers 16. The virtualization unit 15 and the virtual server 16 are composed of programs and data required to execute the programs. The virtualization unit 15 is a hypervisor (which is also called a virtual monitor) that manages the execution of the virtual server 16 on the server, and each of the virtual servers 16 has an operating system (OS).

In this embodiment, the virtualization unit 15 is a program that is stored in the memory 11 and executed by a CPU 12, but the invention is not limited thereto. The virtualization unit 15 may be hardware, firmware, or a combination thereof installed in the server 10. An application program (business program) is executed on the virtual server 16.

The server 10 includes the CPU 12 that executes the programs in the memory 11, an auxiliary storage unit 13, such as a hard disk or a flash memory, and I/O interfaces 14. In FIG. 1, the auxiliary storage unit 13 is provided in the server 10, but the invention is not limited thereto. For example, a storage system, such as a RAID (redundant arrays of inexpensive disk) system, may be connected to the outside of the server 10 through the I/O interface 14. The I/O interface 14 is, for example, an NIC (network interface card) or an HBA (host bus adaptor), and is connected to a network or an external storage unit, such as the RAID system. In this embodiment, a PCI device, such as the NIC and the HBA, is used as an example of the I/O interface 14. For example, a storage unit 22, a network 23, and a storage unit 24 are connected to the I/O interfaces 14. Although simply shown in the drawings, generally, one I/O interface 14 and another I/O interface 14 are connected to the same storage unit 22 or the same network 23.

The virtualization unit 15 includes an I/O mapping unit 30 that manages mapping (correspondence) between the virtual servers 16 and the I/O interfaces 14, an I/O synchronizing unit 31 that synchronizes the states of change source and change destination I/O interfaces 14 when changing the I/O interfaces, and an I/O changing unit 32 that changes the mapping between the virtual servers 16 and the I/O interface 14. The term 'I/O synchronization' or 'synchronization' means to temporarily stop the operations of the change source and change destination I/O interfaces 14 by suspending the execution of a new request and to maintain the change source and change destination I/O interfaces 14 in the same operational state (pause state). The virtual server 16 does not consider the suspension of the operation of the I/O interface 14 as the stop of the operation of the I/O interface 14 since the execution of a request is suspended. Moreover, the term 'I/O change' or 'change' means to switch the I/O interfaces 14 for access to the same target apparatus (a volume of a communication node or a storage unit) from a change source to a change destination, as viewed by the virtual server 16.

The virtualization unit 15 includes an I/O interface table 33 that stores information on a list of I/O interfaces 14 that can be mapped (associated with) to the virtual servers 16, an I/O mapping table 34 that stores the mapping relationship between the virtual servers 16 and the I/O interfaces 14, and an I/O synchronization table 35 that stores configuration during I/O synchronization.

Figures 2, 3:
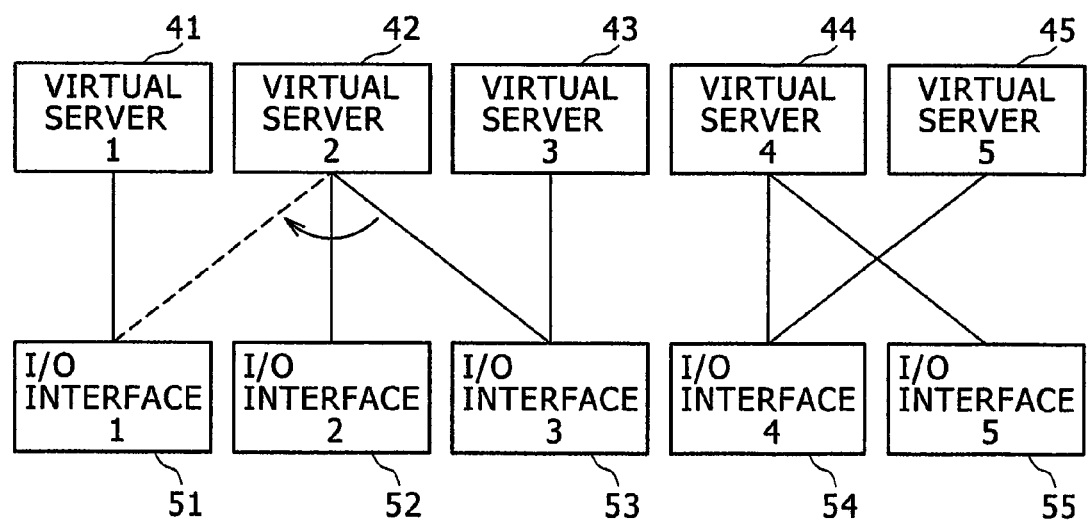
FIG. 2 is a diagram illustrating an example of an I/O interface table.
FIG. 3 is a diagram illustrating mapping between virtual servers and I/O interfaces.

The virtualization unit 15 further includes an I/O buffer 36 that stores a request (an I/O access request) from the virtual server 16 to the I/O interface 14 and a response to the request during I/O synchronization, and a management I/F 37 for communication with the management server 20. The management I/F 37 is a communication interface for communication between the virtualization unit 15 and the management servers 20 through the network 21. FIG. 2 is a diagram illustrating an example of the I/O interface table 33. A column 330 represents the identifier of the I/O interface 14. A column 331 indicates a device identifier of the I/O interface 14. In the case of a PCI device, the device identifier includes a bus number B, a device number D, and a function number F of the PCI device. In FIG. 2, bus number x is represented by "Bx", device number y is represented by "Dy", and function number z is represented by "Fz". A column 332 indicates a memory mapped I/O address (MMIO) of the I/O interface 14. In FIG. 2, the MMIO is represented by a hexadecimal number. A column 333 indicates an interrupt line (INT) of the I/O interface 14. In this embodiment, the I/O interface using the MMIO is described, but the virtual server 16 may use a virtual identifier to access the I/O interface 14 that uses read/write commands and transmitting/receiving commands.

FIG. 3 is a diagram illustrating an example of the mapping between the virtual servers 16 and the I/O interface 14 stored in the I/O mapping table 34. In the example shown in FIG. 3, virtual server 1 (41) and I/O interface 1 (51) are mapped to each other, and access conversion (for example, a virtual MMIO is converted into a physics MMIO) using the I/O mapping table 34 and the I/O interface table 33 is performed for access from the virtual server 1 (41) to the I/O interface 1 (51). In addition, virtual server 2 (42) and virtual server 3 (43) share I/O interface 3 (53).

When the I/O interface 3 (53) is shared, access from the virtual server 2 (42) and the virtual server 3 (43) to the I/O interface 3 (53) involves access scheduling in the virtualization unit 15 in addition to the above-mentioned access conversion. When plural virtual servers share the I/O interface, an I/O change means a change in the I/O interface as viewed from the virtual server, as described above. Therefore, the I/O change is performed as follows. In the structure shown in FIG. 3, when the I/O interface 3 (53) as viewed from the virtual server 2 (42) is changed to, for example, the I/O interface 1

(51), the I/O interface 1 (51) is shared by the virtual server 1 (41) and the virtual server 2 (42), as represented by a dashed line, and the I/O interface 3 (53) is exclusively used by the virtual server 3 (43). Therefore, when the use of the I/O interface 3 (53) stops due to, for example, a trouble, an I/O change corresponding to the virtual server 2 (42) and an I/O change corresponding to the virtual server 3 (43) are needed, and an I/O change process is repeated.

Since other examples can be derived from the example shown in the drawings, a description thereof will be omitted. In this case, the unit of the I/O interface is a minimum functional unit, such as a port, when the I/O interface (a device or a board) 14 includes plural ports. For instance, the unit of the I/O interface may be a function number unit of the PCI device.

FIG. 4 is a diagram illustrating an example of the mapping between the virtual servers 16 (the virtual servers 41 to 45 in FIG. 3) and the I/O interfaces 14 (the I/O interfaces 51 to 55 in FIG. 3) as the I/O mapping table 34. A column 340 represents the identifier of the virtual server 16. A column 341 represents the identifier of the I/O interface 14 that is mapped to the virtual server 16. A column 342 indicates a virtual device identifier of the I/O interface 14 represented in the column 341 that recognizes the virtual server 16 represented in the column 340. A column 343 represents a virtual MMIO of the I/O interface 14 represented in the column 341 that recognizes the virtual server 16 represented in the column 340. A column 344 represents a virtual INT (interrupt line) of the I/O interface 14 represented in the column 341 that recognizes the virtual server 16 represented in the column 340. That is, the virtual server 16 in the column 340 regards the identifier of the I/O interface 14 in the column 341 as the identifier of the virtual device in the column 342, the memory mapped I/O address (MMIO) as the virtual MMIO in the column 343, and the interrupt line (INT) as the virtual INT in the column 344.

FIG. 5 is a diagram illustrating an example of the I/O synchronization table 35. The I/O synchronization table 35 indicates the correspondence among the virtual server 16, the I/O interface 14 of a change source, and the I/O interface 14 of a change destination during synchronization for changing the I/O interface 14. Specifically, a column 350 of the I/O synchronization table 35 represents the identifier of the virtual server 16 that changes the I/O interface 14. A column 351 represents the identifier of the I/O interface 14, which is a change source of the I/O change, among the I/O interfaces 14 that are mapped to the virtual servers 16 in the column 350. A column 352 represents the identifier of the I/O interface 14, which is a change destination of the I/O change, among the I/O interfaces 14 in the column 351. Data corresponding to one line is represented in the I/O synchronization table 35 shown in FIG. 5, but the number of lines of the table increases or decreases according to the number of correspondences between the virtual servers 16 and the I/O interfaces 14 during synchronization for changing the I/O interface 14. When there are plural lines in the I/O synchronization table 35, an I/O synchronization process for plural virtual servers 16 or plural I/O synchronization processes for one virtual server 16 are performed in parallel.

Figures 6, 7:
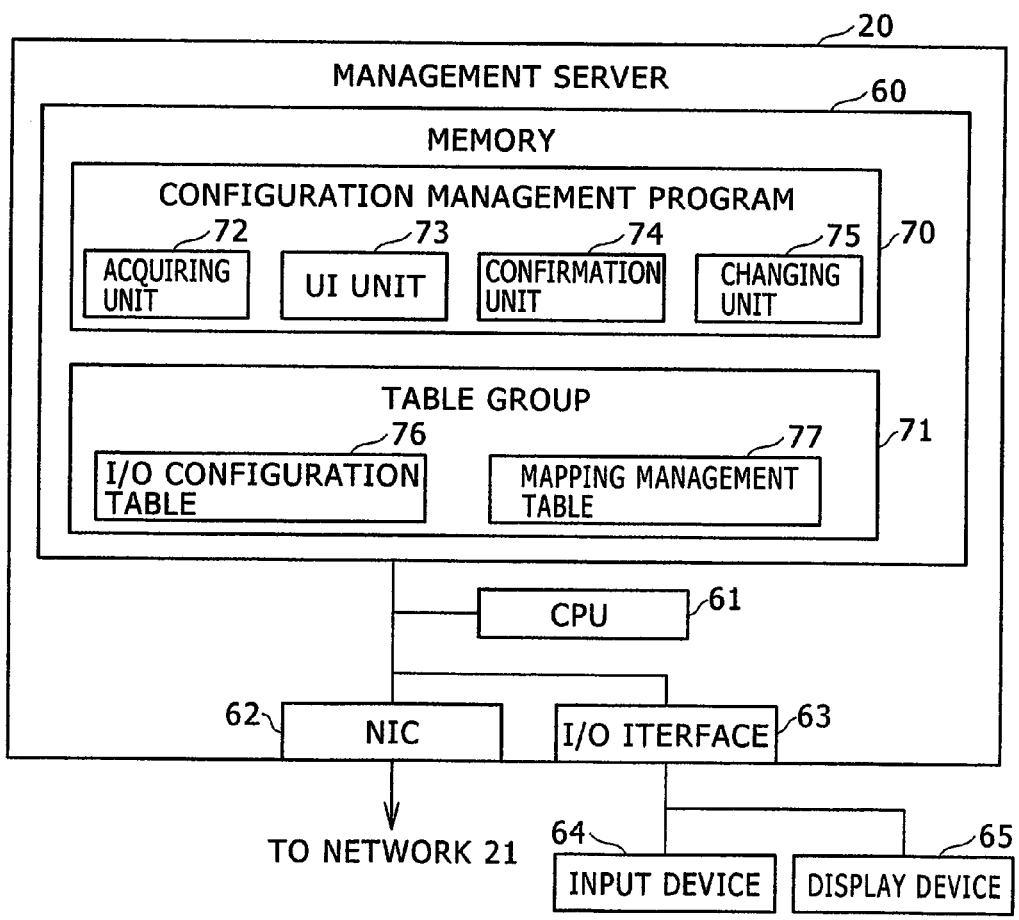
FIG. 6 is a diagram illustrating an example of an I/O buffer.
FIG. 7 is a diagram illustrating the structure of a management server.

FIG. 6 is a diagram illustrating an example of the I/O buffer 36. The I/O buffer 36 is used to temporarily store a request (an I/O access request) of the virtual server 16 during I/O synchronization or a response thereto. A column 360 represents the number of the request or the response stored in the I/O buffer 36. A column 361 represents the identifier of the virtual server 16 related to the stored request or response. A column 362 represents the identifier in the I/O interface 14 related to the request or the response. A column 363 represents data of the request or the response.

FIG. 7 is a diagram illustrating the structure of the management server 20. The management server 20 includes a memory 60 that stores a configuration management program 70 and a table group 71, a CPU 61 that executes the program in the memory 60, an NIC 62 that is connected to the network 21 and communicates with the virtualization unit 15 through the management I/F 37, and an I/O interface 63. The I/O interface 63 connects an input device 64, such as a mouse or a keyboard, and a display device 65, and inputs and outputs information between the management server 20 and a user. Although not shown in the drawings, the I/O interface 63 may be used for connection to a storage unit, such as a USB medium.

The configuration management program 70 includes an acquiring unit 72 that acquires, for example, configuration information of the server 10 or the I/O interface 14 thereof, a UI unit 73 that provides the user with a UI (user interface), a confirmation unit 74 that checks whether to change the I/O interface, and a changing unit 75 that performs an I/O change. The management server 20 includes, as the table group 71, an I/O configuration table 76 that stores the configuration of the I/O interface 14 and a connection destination thereof (for example, the storage unit 22 in FIG. 1) and a mapping management table 77 that manages the mapping between the virtual server 16 and the I/O interface 14.

FIG. 8 is a diagram illustrating an example of the I/O configuration table 76. A column 760 represents the identifier of the I/O interface 14. A column 761 represents the type of I/O interface 14 represented in the column 760. For instance, if the type of I/O interface 14 is an NIC, "NIC" is written in the column 761. If the type of I/O interface 14 is a fiber channel (FC) HBA, "FC-HBA" is written in the column 761. A column 762 indicates the ID of the I/O interface 14 represented in column 760. In the I/O configuration table, an ID is a WWN (world wide name) or a MAC (media access control) address, for example. A column 763 represents a connection destination (for example, the storage unit 22 in FIG. 1) of the I/O interface 14 in the column 760. The connection destination is information capable of specifying a network or an external storage device to which the I/O interface 14 will be connected. For example, the connection destination is a storage area network (SAN) connected with an external storage device, a disk of the external storage device, or a network (ULAN). For example, in FIG. 8, "I/01" indicates that the I/O interface 14 is connected to a storage area network "SAN1" connected with an external storage device and can access a logical disk "LU1" of the external storage device.

FIG. 9 is a diagram illustrating an example of the mapping management table 77. A column 770 represents the identifier of the virtual server 16. A column 771 represents the I/O interface 14 that is mapped to the virtual server 16 represented in the column 770. Information stored in the mapping management table 77 is the same as that in the columns 340 and 341 of the I/O mapping table 34 in the virtualization unit 15. The information items are synchronized with each other by communication through the network 21 (the contents are synchronized).

Figure 10:
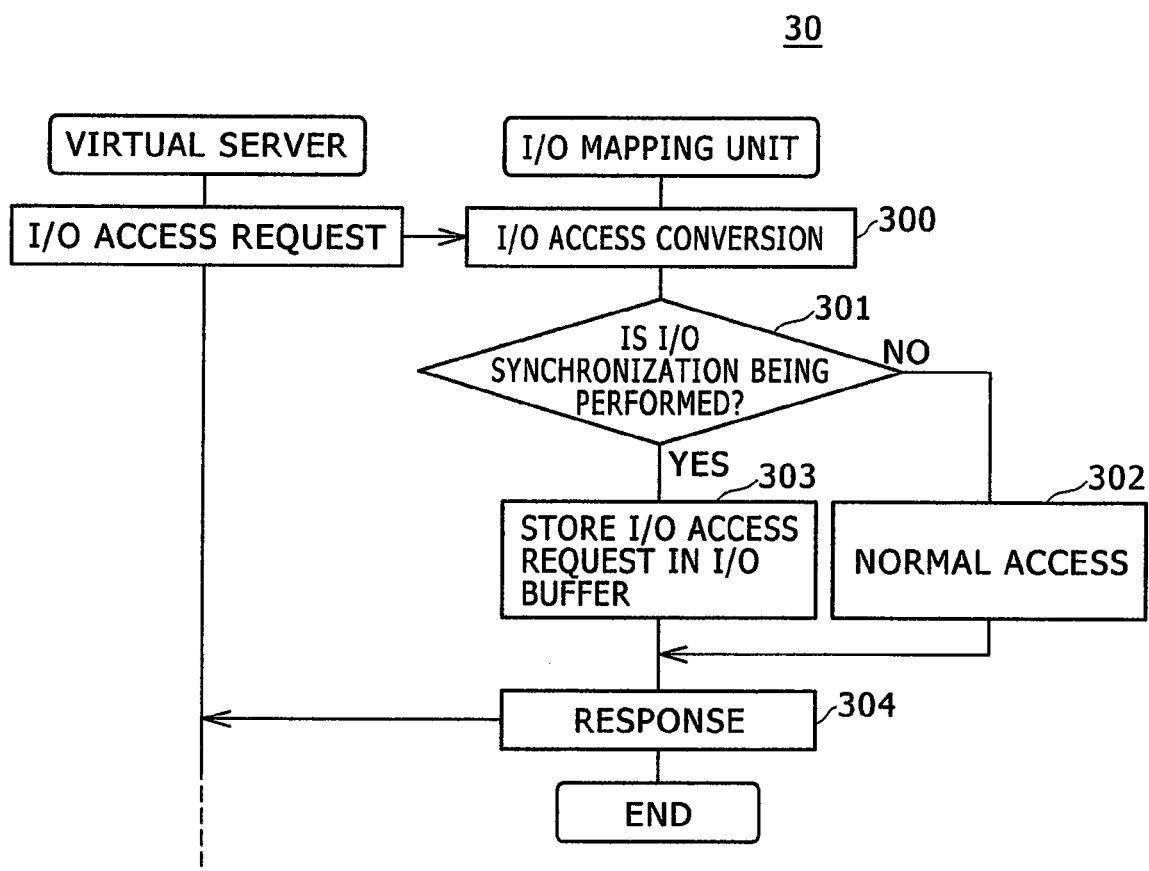
FIG. 10 is a flowchart illustrating the process of an I/O mapping unit.

FIG. 10 is a flow chart illustrating the process of the I/O mapping unit 30 corresponding to an I/O access request from the virtual server 16. When the virtual server 16 issues an I/O access request, the I/O mapping unit 30 performs I/O access conversion (Step 300). The I/O access request from the virtual server includes a read/write type, the initial address of a predetermined region of the memory 11 allocated to the virtual server 16 (in the case of a read request, a region in which read data is stored, and in the case of a write request, a region in which write data is stored), the size of the read/write data, the size of the predetermined region, a virtual device identifier (a bus number, a device number, and a function number), and a virtual MMIO. The initial address of the predetermined region in which the read/write data is stored needs to be subjected to address translation since an address space recognized by the virtual server 16 is different from the address space of the server 10. However, in this embodiment, a description of the address translation for the memory 11 will be omitted, and I/O access conversion for the use of the I/O interface will be described.

In the I/O access conversion, a virtual device identifier 342 of the I/O mapping table 34 shown in FIG. 4 that is matched with the virtual device identifier included in the I/O access request is searched, and an identifier 341 of the corresponding I/O interface 14 is calculated. Then, an identifier 342 of the I/O interface table 33 shown in FIG. 2 that is matched with the identifier of the I/O interface 14 is searched, and a device identifier 331 (a bus number, a device number, and a function number), an MMIO 332, and an INT 333 respectively corresponding to a virtual device identifier 342 (a bus number, a device number, and a function number), a virtual MMIO 343, and a virtual INT 344 of the corresponding I/O interface 14 are acquired.

It is determined whether I/O synchronization is being performed on the I/O interface 14 to be accessed according to the I/O access request from the virtual server from 16 (Step 301). The I/O synchronization will be described below. When the identifier of the virtual server 16 that issues the I/O access request is in the I/O synchronization table 35 and the identifier of the I/O interface 14 to be accessed exists in the I/O synchronization table 35 including the identifier of the virtual server 16 (change source and change destination interfaces 351 and 352), it is determined that the I/O synchronization is being performed. If the I/O synchronization is not performed, the converted device identifier (a bus number, a device number, and a function number), MMIO, and INT are used to access the I/O interface 14 (normal access) (Step 301). If the I/O synchronization is being performed, the I/O access request is stored in the I/O buffer 36 (Step 303). After the normal access or after the I/O access request is stored in the I/O buffer 36, the I/O mapping unit 30 responds to the virtual server 16 (Step 304). After the normal accesses, the I/O mapping unit 30 transmits a response indicating whether the access succeeds or fails. After the I/O access request is stored in the I/O buffer 320, the I/O mapping unit 30 transmits a response indicating that the request has been stored in the I/O buffer 320.

Figure 11A:
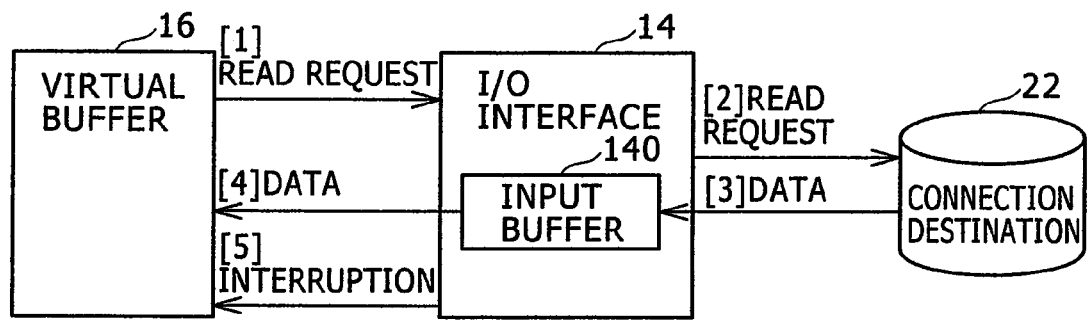
FIGS. 11A to 11C are diagrams illustrating the outlines of a general access sequence.
Figure 11B:
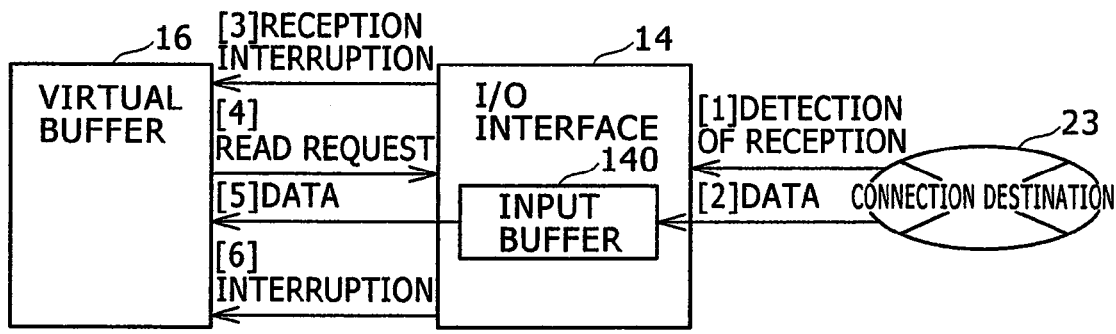
Figure 11C:
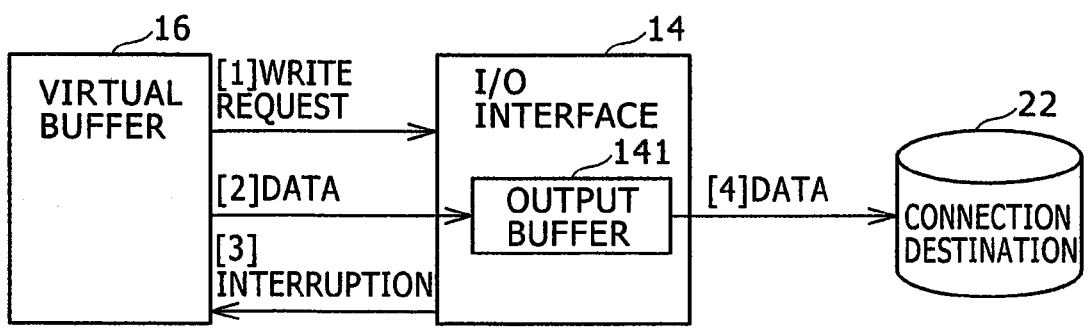

For clarity of the description of the invention, the outline of a normal access sequence (Step 302 in FIG. 10) shown in FIGS. 11A to 11C will be described below. FIG. 11A shows the outline of a process sequence when the I/O access request is a read request, FIG. 11B shows the outline of a process sequence when a read request is issued in response to a trigger from a connection destination, and FIG. 11C shows the outline of a process sequence when the I/O access request is a write request. The I/O access request from the virtual server 16 needs be subjected to access conversion, as described above. However, a description of the access conversion will be omitted here.

As shown in FIG. 11A, when the I/O access request is a read request (1), the I/O interface 14 issues a data read request (2) to a connection destination (for instance, a disk volume 22). Data (3) transmitted from the connection destination in response to the data read request is stored in an input buffer 140 of the I/O interface 14. The data stored in the input buffer 140 is read by access to the address (MMIO) of the input buffer 140 (4), and the read data is transmitted to a predetermined region of the virtual server 16. After the data is stored at a predetermined address of the virtual server 16, the virtual server 16 recognizes the end of a series of read sequences by an interrupt (5) from the I/O interface 14.

In general, DMA (direct memory access) transmission is used for data transmission between a predetermined region of the virtual server 16 and the I/O interface 14, and a DMA controller (not shown) is used to control the transmission. In this case, when the read request is issued to the DMA controller, the virtual server 16 executes other processes (tasks) without using data related to the read request, until an interrupt is input from a timer that sets a time-out period until a response to the request is received, or until a termination interrupt (which corresponds to the interrupt (5)) is input from the DMA controller. Since other access instructions are likely to be issued from other processes, the virtual server 16 (or the server 10) performs multiple I/O access. The DMA controller transmits data from the input buffer 140 to a predetermined region of the virtual server 16 in response to the signal that is output from the I/O interface 14 when data is stored in the input buffer 140, and the interrupt from the DMA controller is transmitted from the I/O interface 14 to the virtual server 16. The size of the input buffer 140 depends on the type of I/O interface 14.

Unlike the above, the virtual server 16 may not initiatively control the I/O interface. The I/O interface 14 may be a communication interface such as an NIC. In this case, the virtual server issues a read request in response to a trigger from the connection destination shown in FIG. 11B. This operation will be described below. When detecting the reception of a signal (for example, detecting that the destination address of a packet indicates its own address) (1), the communication interface issues a reception interrupt (3) to the virtual server 16. Then, the virtual server 16 issues a read request (4) to the I/O interface 14 in response to the reception interrupt (through the DMA controller). In general, at the time when the read request is issued, received data starts to be stored in the input buffer 140. (5) The transmission of the received data stored in the input buffer 140 to a predetermined region of the virtual server 16 and (6) the interrupt from the I/O interface 14 are performed by the same method as that shown in FIG. 11A. When the connection destination is the network 23 and a receiver side receives data, the receiver side is operated in response to a trigger from the destination of a packet and does not initiatively control the I/O interface (in a control process, it is necessary to notify whether data is received. For example, the I/O interface 14 can transmit a signal indicating an inoperable state or a busy signal to a transmitter side). Therefore, I/O synchronization may not be obtained (the continuation of a receiving process). In the case of the sequence shown in FIG. 11B, the input buffer 140 overflows to discard the received packet, without issuing the read request (4).

According to the type of protocols (communications protocols), the virtual server 16 may ensure a predetermined region for storing received data and a reception interrupt (3) may not occur (actually, the reception interrupt occurs. However, the DMA controller starts its operation, and no reception interrupt occurs in the virtual server 16). In such a protocol, a positive/negative response is sent back to the source of the packet in response to the completion of reception (interrupt (6)). Therefore, if the data stored in the predetermined region is discarded and there is no response, the received packet is discarded. That is, the receiving operation is not performed.

In this way, if there is no read operation, it is difficult to initiatively control the I/O interface. Therefore, the I/O access request is not stored in the I/O buffer 36 during I/O synchronization, which will be described below.

A process sequence when the I/O access request is a write request will be described with reference to FIG. 11C. The virtual server 16 stores data to be written in a predetermined region of the memory 11, and issues a write request (1) to the I/O interface 14 through the DMA controller. The DMA controller transmits data (2) from a predetermined region of the virtual server 16 to an output buffer 141 of the I/O interface 14. In general, the address (MMIO) of the output buffer 141 is different from that of the input buffer 140, but a method of designating an address is the same as that in the read operation. When data is stored in the output buffer 141, the I/O interface 14 outputs a write completion signal (3) (termination interrupt) to the virtual server 16. The I/O interface 14 outputs data (4) from the output buffer 141 to a connection destination. In FIG. 11C, the write completion signal (3) (terminal interrupt) is output to the virtual server 16 before the data (4) is output to the connection destination. However, the write completion signal (3) (terminal interrupt) may be output from the I/O interface 14 after data is completely output to the connection destination. The operation of the virtual server 16 during the period from the issuing the write request to the reception of the write completion signal (termination interrupt) is the same as that in the read process. The operation of the DMA controller is also similar to that in the read process except that data is transmitted in the opposite direction.

Figure 12:
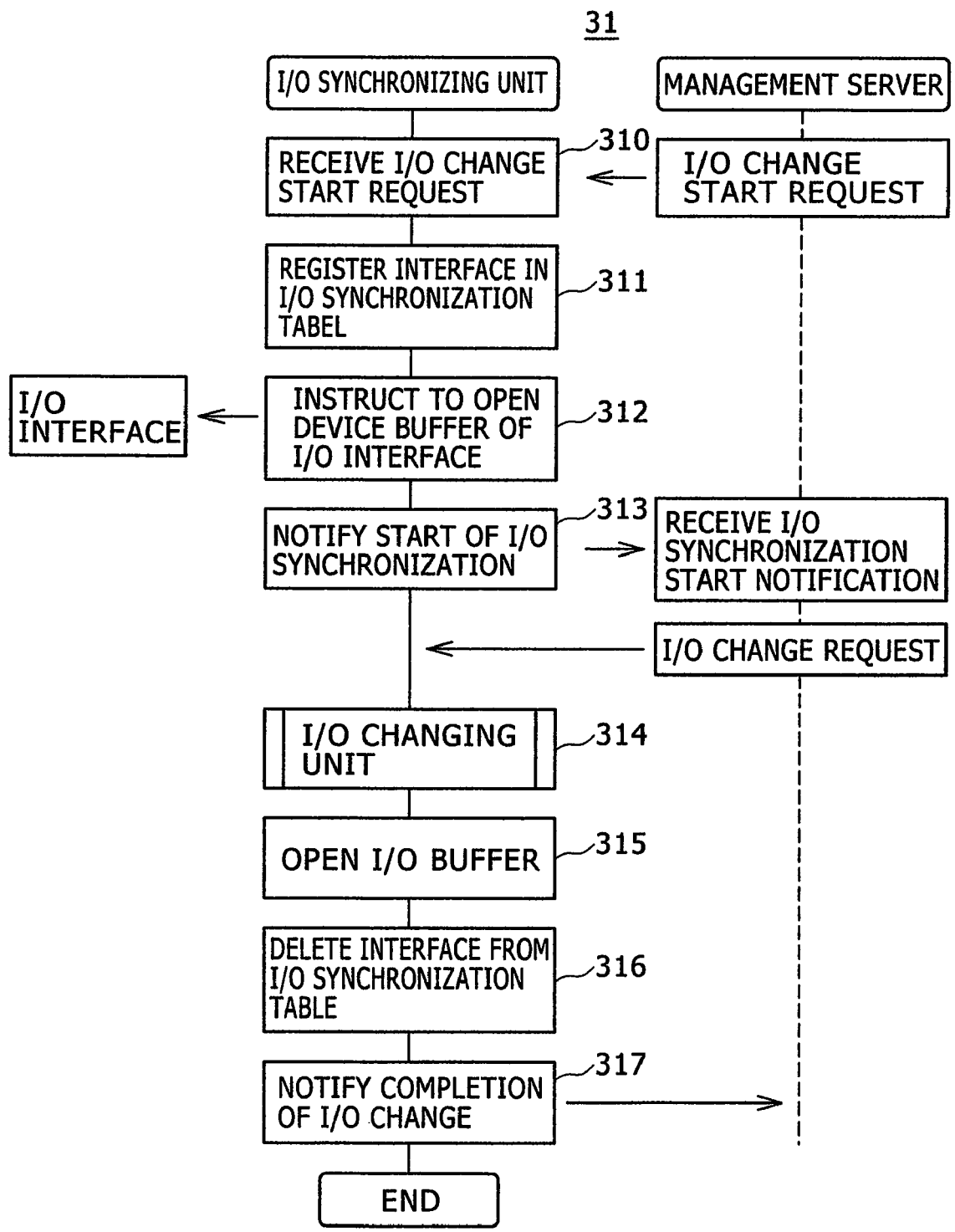
FIG. 12 is a flowchart illustrating the process of an I/O synchronizing unit.

FIG. 12 is a flowchart illustrating the operation of the I/O synchronizing unit 31. The I/O synchronizing unit receives an I/O change start request from the management server 20 (Step 310). The I/O change start request includes, as parameters, the identifier of the virtual server 16 that changes an I/O configuration, the identifier of the change source I/O interface 14, and the identifier of the change destination I/O interface 14 corresponding to the change source I/O interface. When the change destination I/O interface 14 is a communication interface and a network ID thereof is updated, information of the updated network ID is also included in the parameters. The parameters of the I/O change start request, that is, the identifier of the virtual server 16, the identifier of the change source I/O interface 14, and the identifier of the change destination I/O interface 14 corresponding to the change source I/O interface, are registered in the I/O synchronization table 35 (Step 311). The I/O synchronizing unit instructs the I/O interface 14 to open a device buffer (the input buffer 140 and the output buffer 141 in FIGS. 11A to 11C) (Step 312). The I/O interface 14 opens the device buffer according to the instruction. Opening the device buffer is forcibly terminating the I/O process (a transmitting and receiving process in the case of the communication interface) in which data remains in the device buffer. This is based on the idea that higher priority is given to the I/O changing process than to the continuity of the I/O process. When forcible termination of the I/O process is not suitable for the operation of a system, or when the I/O interface 14 does not receive the instruction to open the device buffer, the I/O interface may wait for a predetermined time until the device buffer is opened. When there is no device buffer provided in the I/O interface 14, the instruction to open the device buffer is not needed.

The I/O synchronizing unit 31 notifies the management server 20 that the I/O synchronization starts (Step 313). The management server 20 receives the notification of the start of the I/O synchronization, performs processes, which will be described below, and requests to change the I/O interface. The I/O synchronizing unit 31 receiving the I/O change request calls the I/O changing unit 32. The process of the I/O changing unit 32 will be described below.

When the virtual server 16 issues an I/O access request while the I/O changing unit 32 is being operated, the I/O mapping unit 30 stores the I/O access request in the I/O buffer 36, as described above. Some systems cannot estimate the frequency of I/O access requests issued from the virtual server 16 to the I/O interface 14 during I/O synchronization (or the number of I/O access requests while the I/O changing unit 32 is being operated). That is, the I/O buffer 36 is likely to overflow while the I/O changing unit 32 is being operated. In this case, before the I/O virtual server 16 is operated, the process of the virtual server 16 that is being subjected to I/O synchronization temporarily stops, and after the process of the I/O changing unit 32 is completed, the process of the virtual buffer 16 resumes. The suspension and the resumption of the operation of the virtual server 16 may be executed in response to commands prepared in the virtualization unit 15. The snapshot of the virtual server 16 may be taken when the operation of the virtual server 16 stops, and the operation of the virtual server 16 may resume on the basis of the snapshot. As such, it is possible to guarantee the issue of an I/O access request from the virtual server 16 by temporarily stopping the operation of the virtual server 16 while the I/O changing unit 32 is being operated. In this case, the resumption of the virtual server 16 is different from the restart of the virtual server 16, and it is possible to continuously perform the process from the time when the operation temporarily stops.

The changing unit 32 brings two kinds of results when the I/O interface registered the I/O synchronization table 35 is completely changed and when an I/O change is not performed (when the state before an I/O change request is received is maintained).

The I/O buffer 36 is opened (Step 315). When the I/O changing unit 32 completes the change of the I/O interface 14 registered in the I/O synchronization table 35, the I/O interface 14 corresponding to the request (I/O access request) and a response thereto stored in the I/O buffer 36 is converted from the change source I/O interface 14 into the change destination I/O interface 14, and the converted request (I/O access request) and response are executed. When the I/O changing unit 32 does not perform the change of the I/O interface 14 registered in the I/O synchronization table 35, the request (I/O access request) and the response stored in the I/O buffer 36 are executed without converting the I/O interface 14 (the change source I/O interface 14). In this way, the I/O buffer 36 is opened (empty) with the execution of the request (I/O access request) and the response.

The I/O interfaces to be changed (both the change source and change destination I/O interfaces) are deleted from the I/O synchronization table 35 (Step 316). The term 'I/O interfaces to be changed' is used because the I/O change may succeed or fail. The management server 20 is notified of the completion of the I/O change, clearly discriminating the two cases (Step 317).

Figure 13:
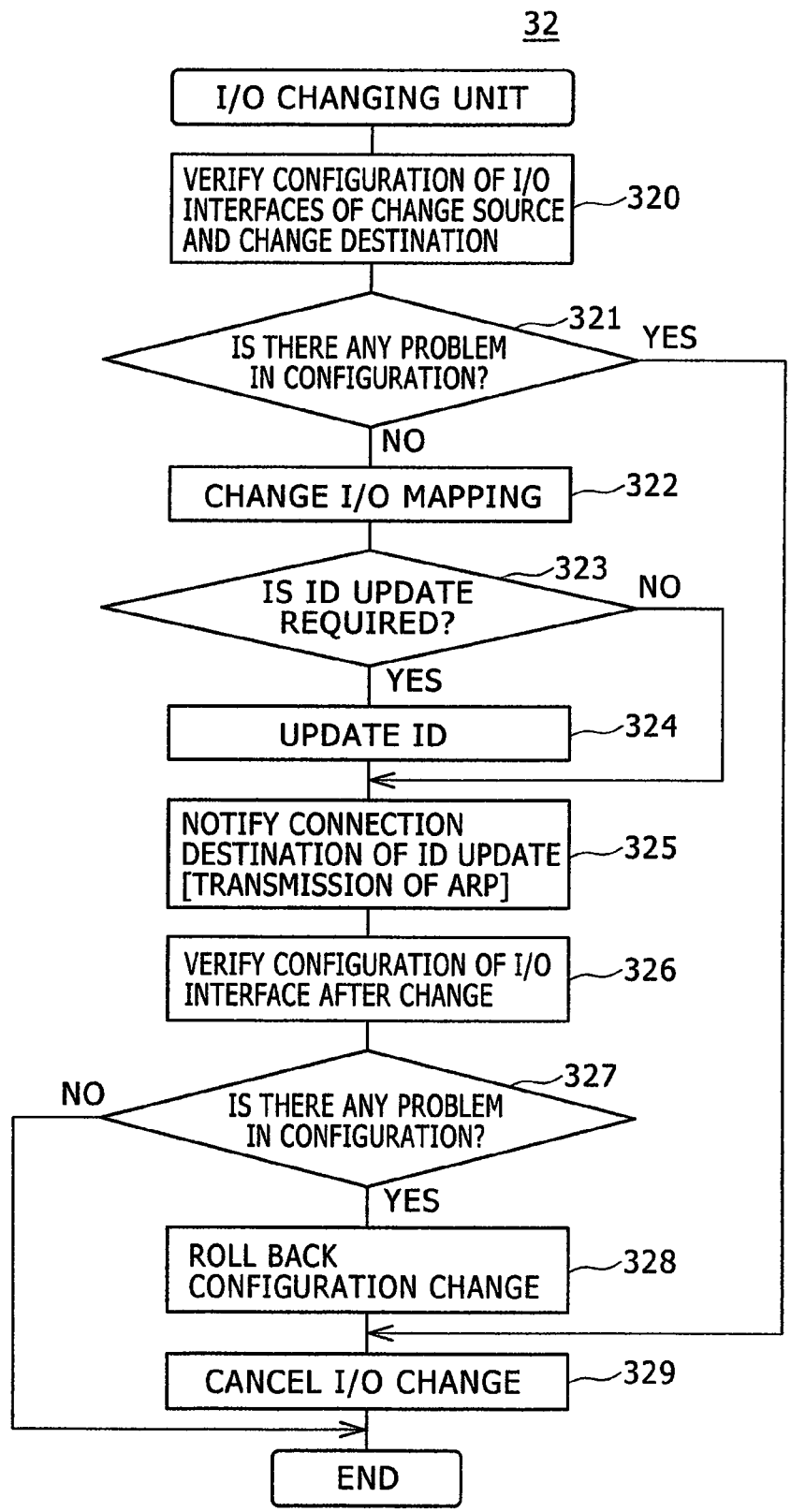
FIG. 13 is a flowchart illustrating the process of an I/O changing unit.

FIG. 13 is a flowchart illustrating the process of the I/O changing unit 32. The I/O changing unit 32 is called by the I/O synchronizing unit 31 (Step 314 in FIG. 12). The structure of the change source I/O interface 14 and the structure of the change destination I/O interface 14 are verified (Step 320). In this case, it is checked whether a configuration change is possible. For example, it is checked whether there is a trouble in the change destination I/O interface 14, or it is checked whether the range of the MMIO recognized by the OS of the virtual server 15 is identical to the range of the MMIO of the I/O mapping table 34. As the result of the verification, when there are problems in the configuration change, the process proceeds to Step 329.

I/O mapping is changed (Step 322). In order to change the mapping between the change source I/O interface 14 and the virtual server 16 to the mapping between the change destination I/O interface 14 and the virtual server 16, in the I/O mapping table 34, the change source I/O interface 14 that is mapped to the virtual server 16 is updated with the change destination I/O interface 14 (specifically, the identifier 341 of the I/O interface is overwritten to the identifier 341 of the change destination I/O interface in the I/O mapping table 34).

It is determined whether to update the network ID of the change destination I/O interface 14 (Step 323). When the network ID is included as a parameter in the I/O change start request that is received by the I/O synchronizing unit 31, the ID update is needed. The network ID of the change destination I/O interface 14 is updated. Here, when the I/O interface 14 has an update function, the I/O changing unit requests the I/O interface 14 to update the network ID as a parameter. When it is necessary to execute a program in order to rewrite the network ID, the I/O changing unit 32 generates a new virtual server for rewriting the network ID, maps an I/O interface to which the network ID will be rewritten to the generated virtual server, delivers a network ID rewrite program to the virtual server, and executes the program on the virtual server. Then, when the execution of the program is completed, the I/O changing unit demaps the I/O interface from the virtual server. It is not preferable that the same network ID exists in plural I/O interfaces. Therefore, it is preferable to rewrite the network ID of the change source I/O interface 14 as well as the network ID of the change destination I/O interface 14.

The I/O changing unit notifies the connection destination of the change in the network ID (Step 325). For instance, in the network, in order to update an ARP (address resolution protocol) table of a connection destination, an ARP packet is transmitted, a log-in/log-out process (pLogin/Logout of FC) is performed, or an API (application programming interface) or a CLI (command line interface) that is provided by an apparatus on the network is used to change the connection destination.

The configuration of the I/O interface 14 after the I/O change is verified (Step 326). The verification of the configuration includes checking whether the I/O interface 14 of the change destination is out of order, checking the request and the response (by the transmission and reception of packets), and checking the network ID when the network ID is successfully changed.

If there are any programs as the result of the verification (Step 327), in order to return the configuration before the change, the mapping of the I/O interface 14 is returned to the state before the configuration is changed (Step 328). In order to return the mapping of the I/O interface 14 to the state before the configuration is changed, the processes of Steps 322 to 325 are rolled back.

The I/O changing unit cancels the change in the I/O configuration, notifies the cancellation of the change in the I/O configuration and the cause thereof (Step 329), and then ends the process. If there is no program as the result of the verification (Step 327), the I/O changing unit notifies the completion of the I/O change. The notification is succeeded to the I/O synchronizing unit 31, and then transmitted to the management server 20 (Step 317 in FIG. 12).

Figure 14:
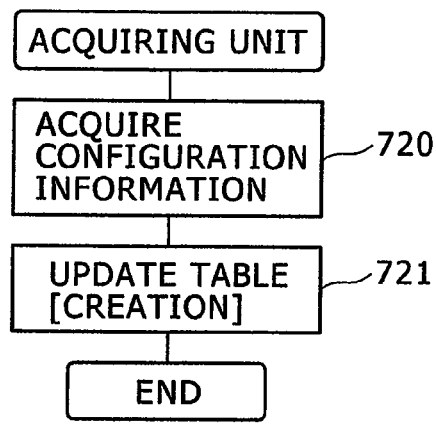
FIG. 14 is a flowchart illustrating the process of an acquiring unit.

Next, the operation of the configuration management program 70 of the management server 20 according to this embodiment will be described. FIG. 14 is a flowchart illustrating the process of the acquiring unit 72 of the configuration management program 70. The acquiring unit 72 acquires configuration information (Step 720). The acquired configuration information is for making and updating the I/O configuration table 76 and the mapping management table 77. The information may be acquired by using an API (application program interface) or a CLI (command line interface) that is provided from the virtualization unit 15, a switch of the network, an apparatus that stores the configuration information of a server, an external storage device, or software that manages the configuration information of a computing system. Alternatively, the information may be acquired from the user or a file. The acquired information is used to make and update the I/O configuration table 76 and the mapping management table 77 (Step 721).

Figure 15:
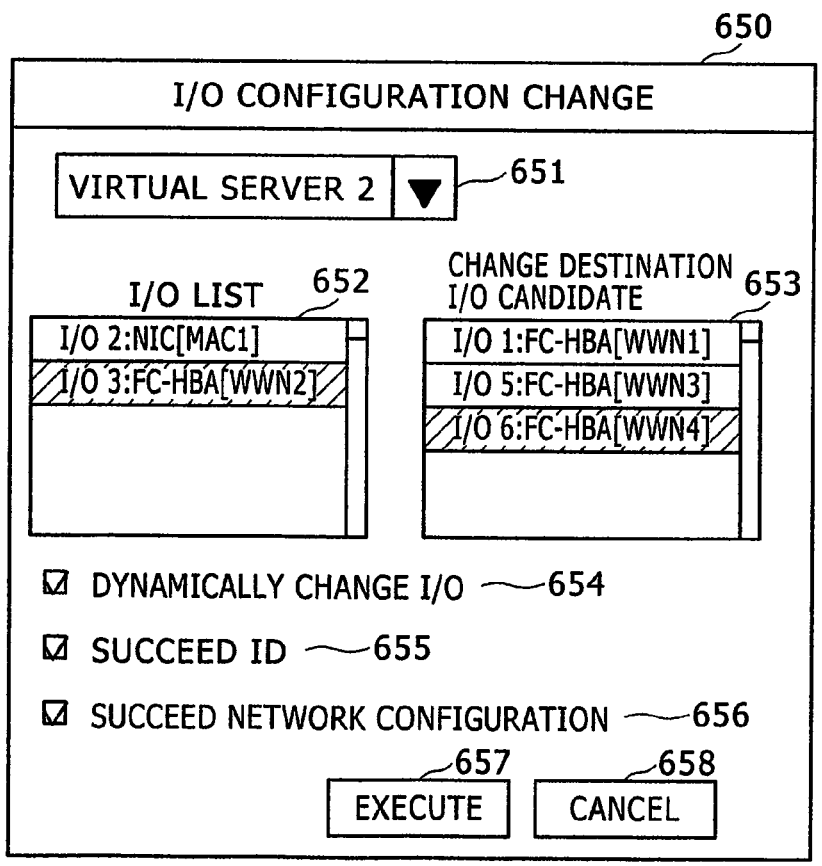
FIG. 15 is a diagram illustrating an example of a GUI.

FIG. 15 is a diagram illustrating an example of a GUI (graphical user interface), which is an example of a UI (user interface) that is provided by the configuration management program 70 in order to acquire setting information from the user. The GUI displays, for example, a browser or a dedicated program and text on the display device 65 that is connected to the management server 20 or a display device of another terminal that is connected to the management server 20 through the network. A window 650 indicates the window of a browser and a program. For example, information on the mapping between the I/O interface 14 and the virtual server 16 and buttons for the change operation are displayed on the window 650. The user selects the identifier of the virtual server 16 to change the mapping of the I/O interface 14 in a virtual server selection frame 651. The selection frame 651 of the virtual server 16 shows a pull-down menu in the example shown in FIG. 15.

An I/O list 652 shows a list of the I/O interfaces 14 that are currently mapped to the virtual server 16 (virtual server 2 in FIG. 15) selected from the selection frame 651. FIG. 15 shows the identifier (for example, I/02), the I/O type (for example, an NIC), and the network ID (for example, MAC1) of the I/O interface 14. However, information, such as a connection destination network, may be added. When the I/O interface 14 displayed in the I/O list 652 is being subjected to I/O synchronization, information indicating the state thereof may be displayed. It is possible to select the I/O interface 14 by placing a cursor of a mouse in a specific I/O interface 14 of the I/O list 652 and clicking the mouse (a hatched line in FIG. 15).

A list of the candidates of the change destination I/O interface 14 that is selected from the I/O list 652 is displayed in a change destination I/O candidate field 653. In FIG. 15, since "FC-HBA" is selected as the I/O type from the I/O list 652, the I/O interfaces 14 of the same I/O type "FC-HBA" are displayed in the list of the change destination I/O candidates 653. A method of searching the change destination I/O candidates 653 will be described below. When the I/O interface 14 is selected from the change destination I/O candidates 653, the selected I/O interface 14 is a change destination I/O interface.

A check box 654 is checked when the I/O interface 14 is changed without restarting the OS that is being executed on a target virtual server 16. A check box 655 is checked when the network ID is successful in changing from a source I/O interface to a change destination I/O interface. A check box 656 is checked when the configuration of the network that is connected to the change source I/O interface is successful to the change destination I/O interface. When an "execution" button 657 is clicked with the mouse, a request to execute an I/O configuration change is sent from the browser or the GUI program to a UI unit 73. When a "cancel" button 658 is clicked, the window 650 is closed. In the window 650, the content of the selection frame 651 of the virtual server 16 and the content selected from the I/O list 652 and the change destination I/O candidate field 653 are transmitted to the UI unit 73 as the identifiers of the virtual server 16, the change source I/O interface, and the change destination I/O interface. The checked states of the check boxes are also transmitted from the browser or the GUI program to the UI unit 73.

Figure 16:
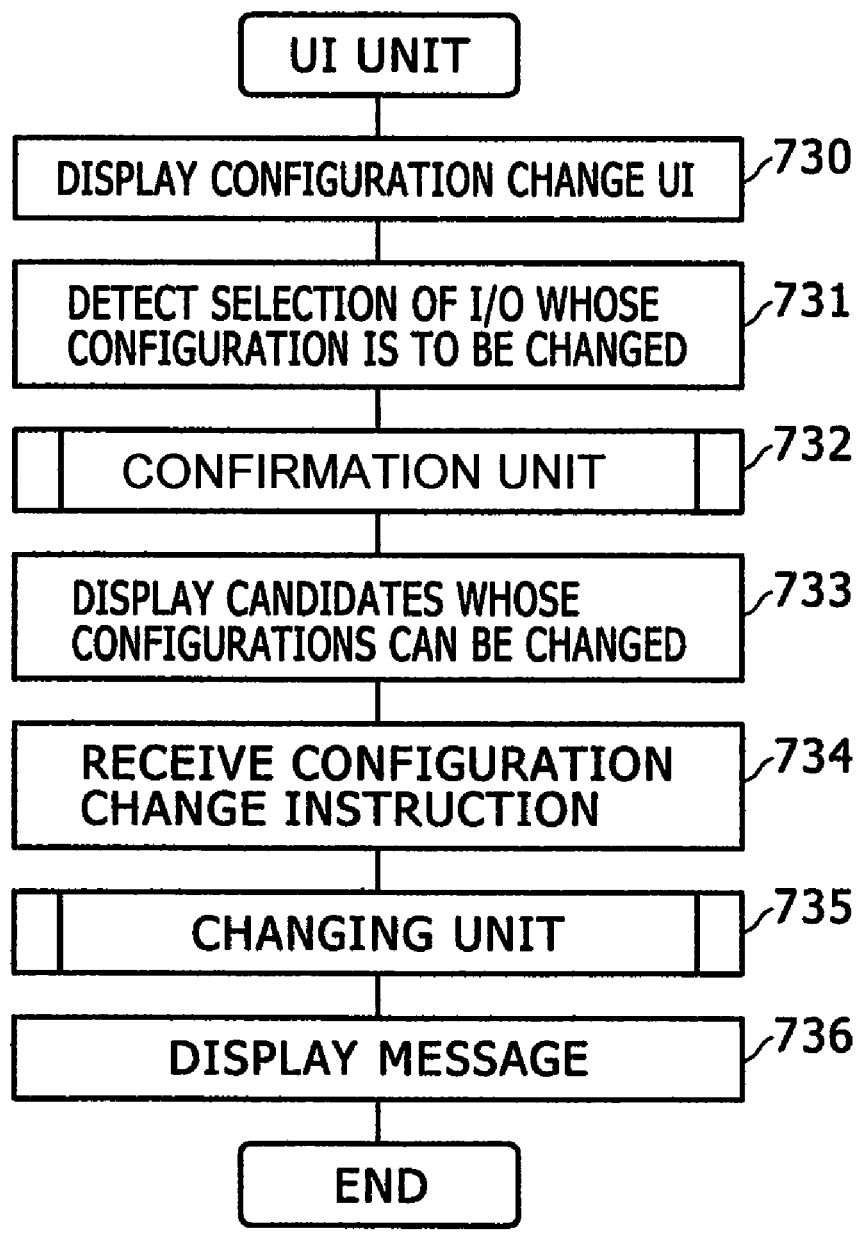
FIG. 16 is a flowchart illustrating the process of a UI unit.

FIG. 16 is a flowchart illustrating the process of the UI unit 73. The UI unit 73 displays the UI (the window 650) shown in FIG. 15 (Step 730). It is detected that the user selects the identifier of the virtual server 16 and the identifiers of the change source I/O interface from the UI (the window 650) (Step 731). The UI unit requests the confirmation unit 74 to search the candidates of a change destination I/O interface corresponding to the selected change source I/O interface (Step 732). However, although not shown in the drawings, the confirmation unit 74 inquires the state of the selected change source I/O interface of the virtualization unit 15. When the selected change source I/O interface is being subjected to I/O synchronization, the confirmation unit 74 that cannot select the I/O interface searches the candidates of a change destination I/O interface corresponding to the change source I/O interface, and responds to the UI unit 73. The UI unit 73 displays the candidates of the change destination I/O interface received from the confirmation unit 74 as the change destination I/O candidates 653 on the UI (window 650) (Step 733). The UI unit 73 receives a configuration change instruction from the UI (the GUI program or the browser) (Step 734) and requests the changing unit 75 to change the I/O interface 14 (Step 735). This corresponds to the detection of the click of the "execution" button 658. The changing unit 75 changes the mapping between the virtual server 16 and the I/O interface 14 (Step 735). The process of the changing unit 75 will be described below. When the process of the changing unit 75 is completed, a message indicating that the change in the configuration of the I/O interface 14 is completed is displayed on the UI (the window 650) (Step 736). When an error occurs in the process of the UI unit 73, a message indicating the occurrence of the error may be displayed. For instance, the change in the I/O configuration change may be canceled.

Next, an example of the process of the UI unit 73 changing (I/O changing) the mapping between the virtual server 16 and the I/O interface 14 on the basis of the instruction from the user will be described. The change (I/O change) in the mapping between the virtual server 16 and the I/O interface 14 may be performed when a load is concentrated on a specific I/O interface 14, when there are indications that a trouble will occur in a specific I/O interface 14, or when a trouble occurs in a specific I/O interface as well as on the basis of the instruction from the user, in terms of the operation of the computing system.

When a load is concentrated on a specific I/O interface 14, it is possible to equalize the load by changing the mapping of the virtual server 16 that uses the I/O interface 14 to another I/O interface 14 of the same type (having compatibility). In order to perform the equalization, the virtualization unit 15 may monitor the information of the function of each I/O interface, and the management server 10 (the configuration management program 70) that obtains the monitoring results may determine the change source and change destination I/O interfaces 14 (or candidates). In the determining process, one I/O interface 14 having the highest load is selected from the I/O interfaces 14 of the same type (having compatibility), one of the virtual servers 16 using the I/O interface 14 is selected, and an I/O interface 14 with the lowest load is used as the I/O interface 14 used by the selected virtual server 16. When the load of the I/O interface 14 that is exclusively used by one virtual server 16 is excessively high, the virtualization unit 15 generates a new virtual server, divides the function of the virtual server 16 that increases the load of the I/O interface 14, and makes the new virtual server execute the divided function. Then, the virtualization unit 15 performs the process of selecting the virtual server 16. When the virtual server 16 is selected or the change source and change destination I/O interfaces 14 (or candidates) are determined, the process of the UI unit 73 may be selectively used for the user to check the selection and the determination, if necessary.

The process when a sign of the trouble of the I/O interface 14 is detected or when a trouble occurs in the I/O interface 14 will be simply described. Information on the trouble occurring in the I/O interface 14 is collected. For instance, the information on the trouble includes overheating of the I/O interface 14, the frequent occurrence of an error correcting process, interrupt loss, and the occurrence of an event, which is a sign of serious trouble. When the virtualization unit 15 monitors information on the trouble of the I/O interface 14 and the information indicates the trouble of the I/O interface 14 or signs of the trouble, the information is transmitted to the management server 10 (the configuration management program 70). The management server 10 receiving the information displays the identifier of the I/O interface 14 in which a trouble is likely to occur or which is out of order, and starts the UI unit 73. In this case, the management server specifies the change source I/O interface 14 in which a trouble is likely to occur or which is out of order and the virtual server 16 that uses the I/O interface 14. After determining the I/O interfaces 14 of the same type (having compatibility) as the candidates of a change destination, the management server controls the UI unit 73 to execute Step 732.

Figure 17:
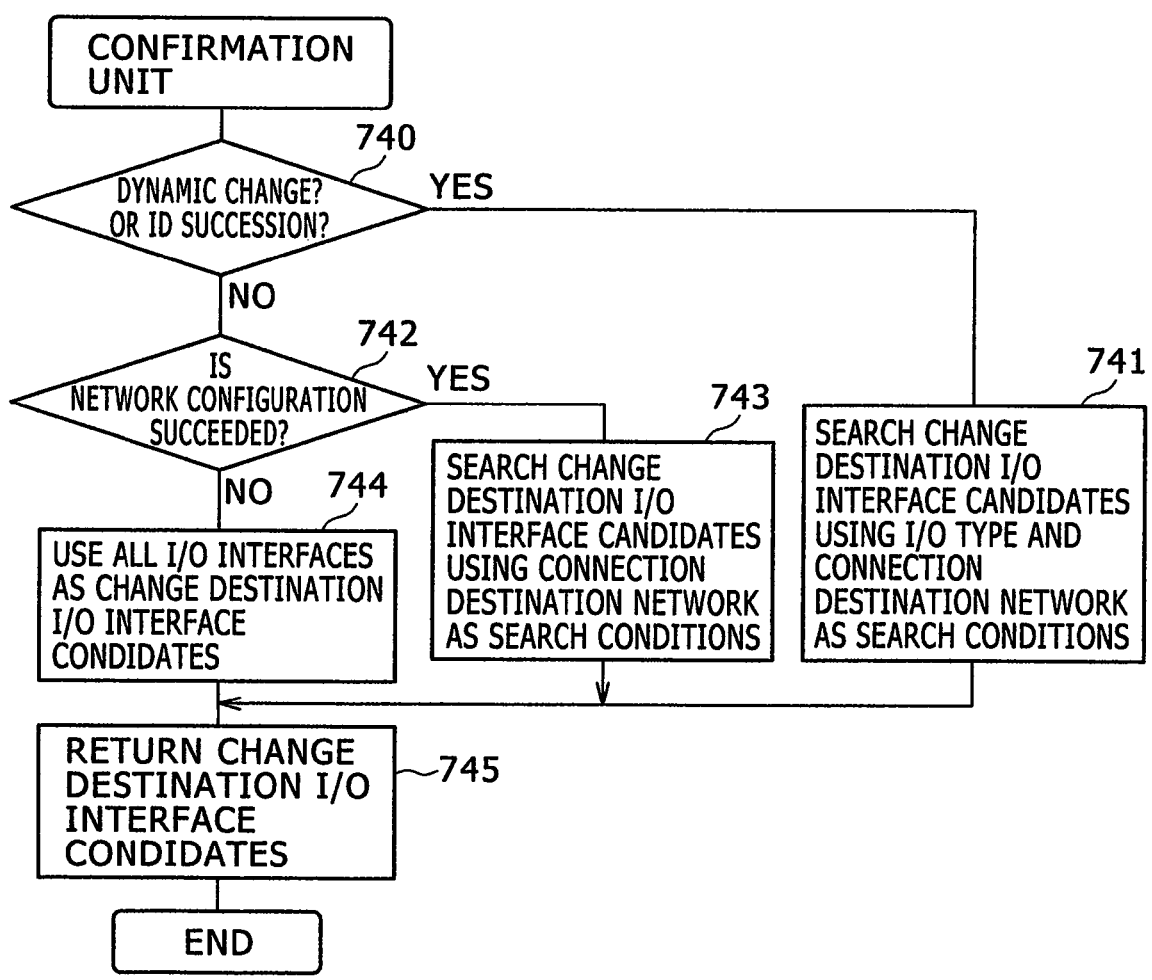
FIG. 17 is a flowchart illustrating the process of a confirmation unit.

FIG. 17 is a flowchart illustrating the process of the confirmation unit 75. It is checked whether to dynamically change the I/O configuration or to take over the network ID on the basis of whether the check box 654 of the window 650 is checked or whether the check box 655 is checked (Step 740).

When it is determined that the I/O configuration is dynamically changed or that the network ID is successful, the confirmation unit searches the change destination I/O interface 14 that can be changed from the change source I/O interface 14, using the I/O type of the I/O interface 14 and the connection destination network as search conditions (Step 741). The confirmation unit searches an I/O interface that has the same I/O type as the change source I/O interface 14, using the I/O type of the I/O configuration table 76 (column 761). However, the I/O types may be different. For instance, the I/O interfaces having the same function (compatibility) may be candidates of the change destination I/O interface. The user may define the standard for determining whether the I/O interfaces are of the same type. In addition to the above-mentioned search conditions, information of the connection destination (column 763) of the I/O configuration table 76 is used to search the I/O interfaces 14 that are connected to the network to which the change source I/O interface is connected as the candidates. In the search operation, the connection destinations may be different. For instance, when the connection destination is finally connected to a target device to which the change source I/O interface is connected, or when the I/O interface 14 is connected to a storage device that stores the same information as the storage device that is used by the change source I/O interface, the connection destination or the I/O interface may be used as the candidate. The user may define this condition.

When it is determined that the I/O configuration is not dynamically changed and that the network ID is not successful, it is checked whether to take over the network configuration, on the basis of whether the check box 656 of the window 650 is checked (Step 742). When the network configuration is successful, an I/O interface that can be changed from the change source I/O interface is searched using the connection destination network of the I/O interface 14 as a search condition. Information of the connection destination (the column 763) of the I/O configuration table 76 is used to search the I/O interfaces 14 that are connected to the network to which the change source I/O interface is connected as the candidates. In the search operation, the connection destination networks may be different. For instance, when a network is finally connected to a target device to which the change source I/O interface is connected, or when the I/O interface 14 is connected to a storage device that stores the same information as the storage device that is used by the change source I/O interface, the network or the I/O interface may be used as the candidate. The user may define this condition.

When none of the check boxes 654 to 656 of the window 650 are checked, the confirmation unit inquires the virtualization unit 15 and sets all the I/O interfaces managed by the virtualization unit 15 as the candidates of the change destination I/O interface 14 (Step 744). The confirmation unit returns the candidates of the change destination I/O interface 14 to the UI unit 73 (Step 745). The confirmation unit 74 may provide the user with the options to execute only Steps 744 and 745 in order to correspond to the user who does not require the search of the candidates of the I/O interface 14.

Figure 18:
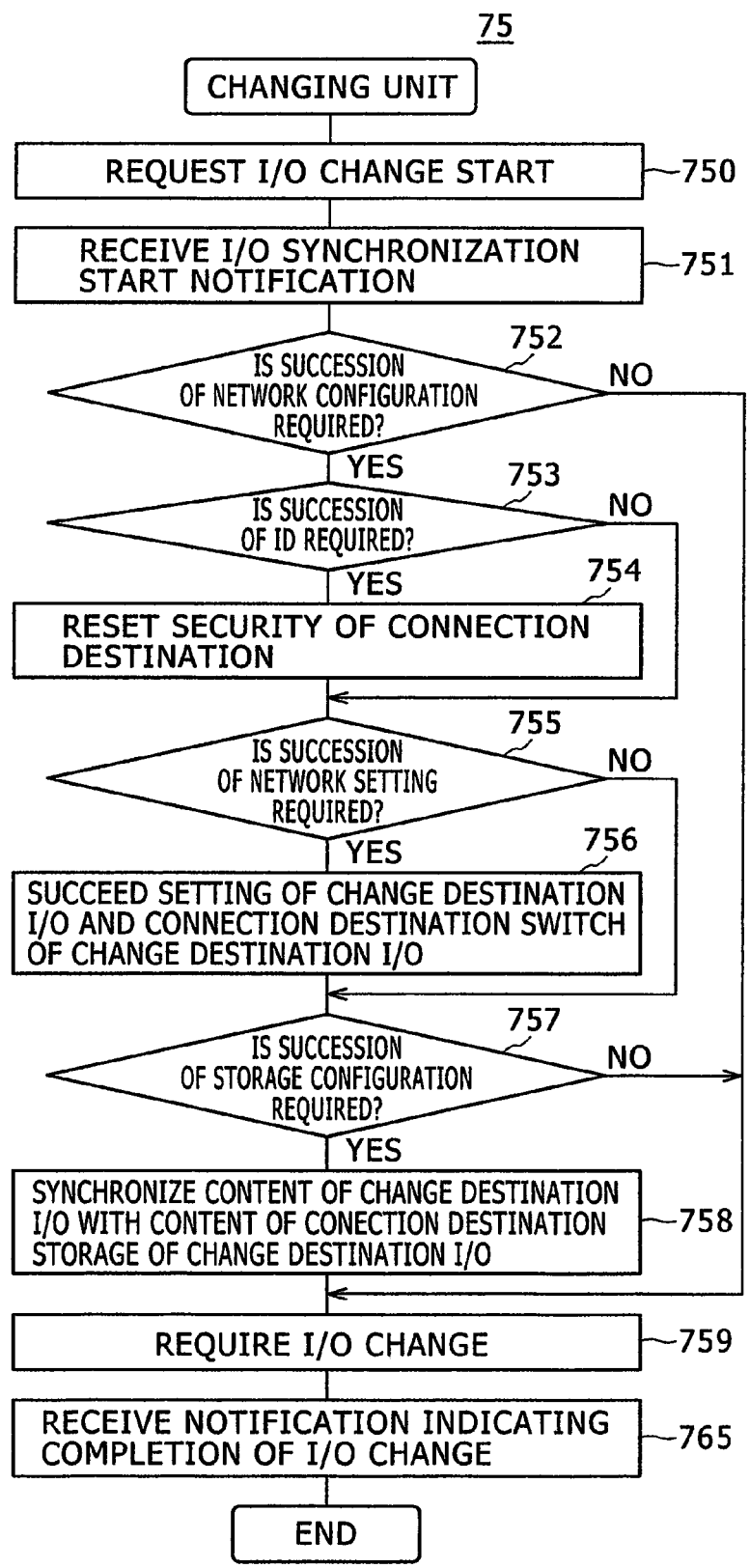
FIG. 18 is a flowchart illustrating the process of a changing unit.

FIG. 18 is a flowchart illustrating the process of the changing unit 75. The changing unit requests the virtualization unit 15 to change the I/O configuration (Step 750). In Step 310 of FIG. 12, the I/O synchronizing unit 31 receives the request. The changing unit receives a notice of the start of I/O synchronization from the virtualization unit 15 (Step 751). This step corresponds to Step 313 of the I/O synchronizing unit 31 in FIG. 12. The changing unit determines whether to take over the network configuration on the basis of whether the check box 656 of the window 650 is checked (Step 752). When it is determined to take over the network configuration, the changing unit determines whether to take over the network ID (Step 753). When it is determined to take over the network ID, the security of the connection destination is reset (Step 754). When the I/O interface 14 used by the virtual server 16 is changed, the network IDs of the change source I/O interface and the change destination I/O interface are also changed. Therefore, when security is set in an apparatus on the network on the basis of the network ID, the network ID of the change source I/O interface that is used to set the security of the apparatus is rewritten to the network ID of the change destination I/O interface. In this way, it is possible to reduce the influence of a change in the network ID in the computing system that is connected to the network. When there is an apparatus that uses the network ID to perform setting operations other than the security setting, rewriting is also performed on the apparatus. A detailed description of the rewriting is omitted, but the changing unit 75 instructs the virtualization unit 15 to execute the rewriting.

It is determined whether to take over the network setting on the basis of whether the change source and change destination I/O interfaces are NICs, with reference to the I/O type of the I/O configuration table 76 (column 761) (Step 755). When the network setting is successful, Information set to an apparatus on the network that is connected to the change source I/O interface is set to an apparatus on the network that is connected to the change destination I/O interface. For instance, when the I/O interfaces 14 are connected to different ports of network switches, VLAN (virtual LAN) and QoS (quality of service) that are set to the network switch port connected to the change source I/O interface are set to a network switch port that is connected to the change destination I/O interface. A detailed description of the actual setting thereof is omitted, but the changing unit 75 instructs the virtualization unit 15 to execute the setting.

When a storage that is connected to the change source I/O interface is different from a storage that is connected to the change destination I/O interface, the changing unit determines that the storage configuration is successful (Step 757), and matches the content (data) stored in the storage that is connected to the change source I/O interface with the content (data) stored in the storage that is connected to the change destination I/O interface. For instance, this process is performed using software for the replication of the storage or the replication function of the storage. It is possible to change the configuration of the storage of the connection destination or the structures of the I/O interfaces 14 having different network configurations by taking over the network configuration.

The changing unit requests the virtualization unit 15 to change the I/O configuration (Step 759). This step becomes an opportunity to continuously perform the process of the I/O synchronizing unit 31 shown in FIG. 12 from Step 314. The changing unit waits until the I/O change completion notification is received from Step 317 of the I/O synchronizing unit 31. When the notification is received, the changing unit ends the process.

Steps 752 to 758 of the changing unit 75 make instructions for the virtualization unit 15. Since the virtualization unit 15 executes Steps 752 to 758, the changing unit requests the start of an I/O change after Steps 752 to 758 are executed (Step 750). Therefore, it is possible to omit Steps 751 and 759 of the changing unit 75 and Step 313 of the I/O synchronizing unit 31, and it is possible to reduce the communication overhead between the management server 20 and the server 10 and an overhead due to an intermediate process of the management server 20 in a series of I/O change processes.

According to the above-described embodiment, it is possible to change the configuration of the I/O interface used by a virtual server while continuously performing the process of the virtual server. Therefore, it is possible to reduce the influence of the I/O change on tasks performed by a computing system.

Second Embodiment

In the first embodiment, the virtualization unit 15 of the server 10 changes the mapping between the virtual server 16 and the I/O interface 14. In the second embodiment, an I/O management unit that is independent of the virtualization unit 15 performs a process of changing the mapping between the virtual server 16 and the I/O interface 14 including the I/O access conversion process described in the first embodiment.

Figure 19:
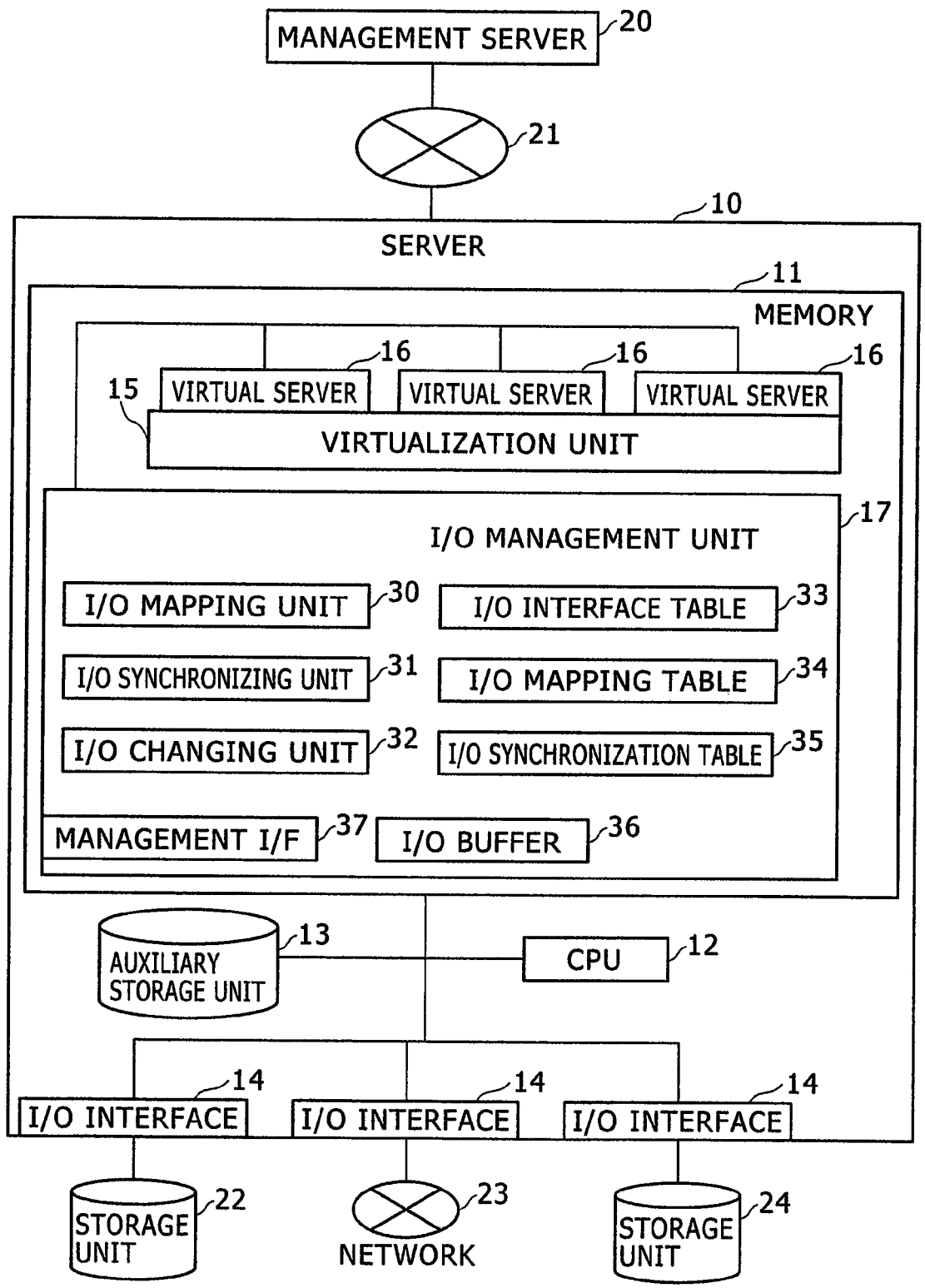
FIG. 19 is a diagram illustrating the structure of a computing system according to a second embodiment of the invention.

FIG. 19 is a diagram illustrating the structure of a computing system according to the second embodiment. This embodiment differs from the first embodiment in that an I/O management unit 17 is provided to execute a process of changing the mapping between the virtual server 16 and the I/O interface 14 including an I/O access conversion process, and the virtual server 16 is connected to the I/O management unit 17 without the virtualization unit 15 interposed therebetween. Although the structure of the second embodiment differs from that of the first embodiment, the comparison between the structure shown in FIG. 1 (first embodiment) and the structure shown in FIG. 19 (second embodiment) shows that the I/O change process described in the first embodiment is not different from that in the second embodiment.

According to the second embodiment, it is possible to apply the I/O change process described in the first embodiment to a virtual server system in which a unit that is independent of the virtualization unit 15 performs an I/O access conversion process, in order to reduce the time required to process an access from the virtual server 16 to the I/O interface 14.

Third Embodiment

Figure 20:
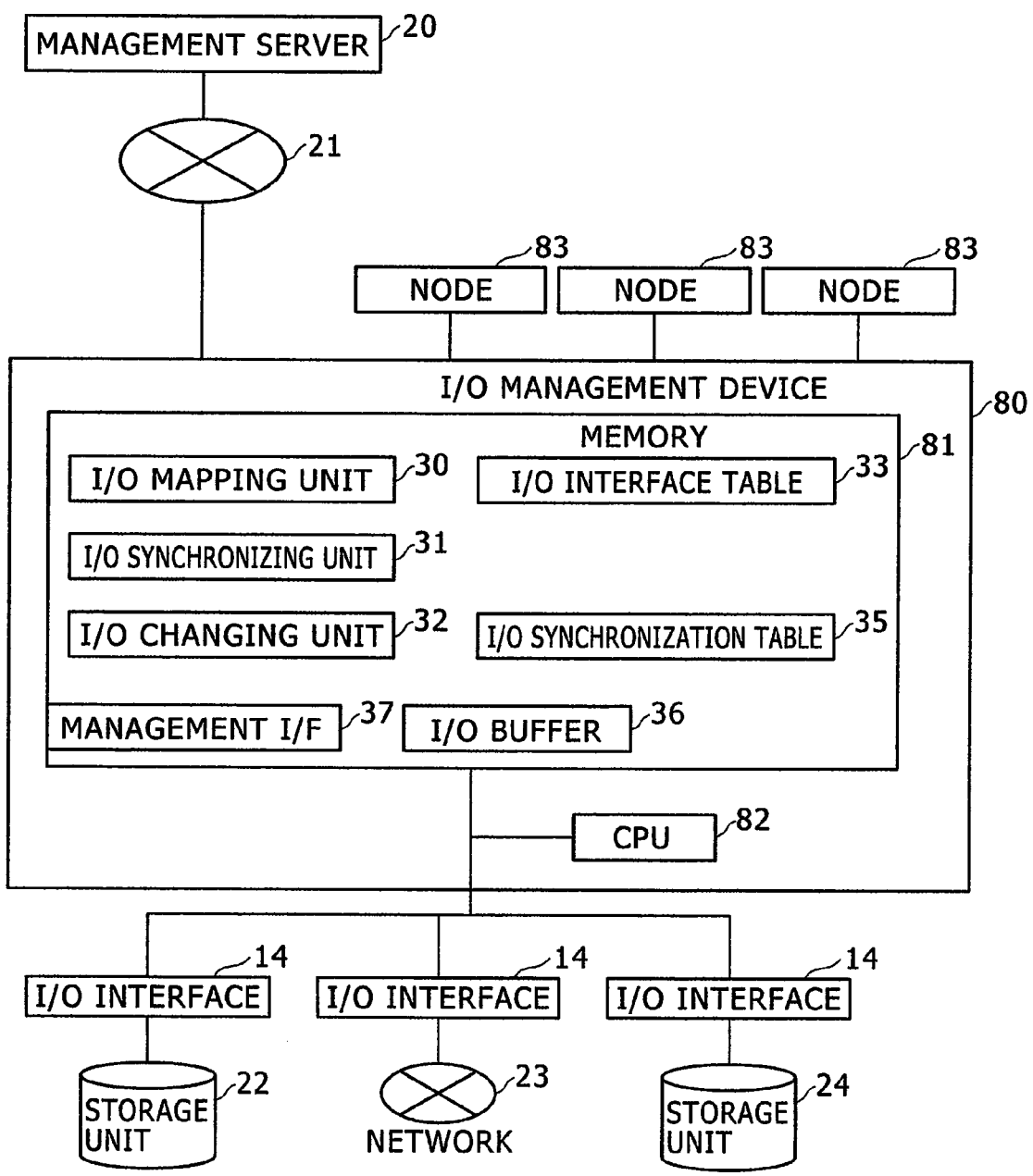
FIG. 20 is a diagram illustrating the structure of a computing system according to a third embodiment of the invention.

FIG. 20 is a diagram illustrating the structure of a computing system according to a third embodiment of the invention. In the third embodiment, a physical server (in FIG. 20, a node 83) is used as the virtual server 16 according to the second embodiment and an independent I/O management device 80 is used as the I/O management unit 17. The node 83 is connected to the I/O management device 80, and the I/O management device 80 is connected to the management server 20 through the network 21. The I/O interfaces 14 are connected to each other. In FIG. 20, the management device 80 is independent of the I/O interfaces 14, but the invention is not limited thereto. For example, the I/O management device 80 may include the I/O interfaces 14. Since the node 83 is a general computer, a description thereof will be omitted.

The I/O management device 80 is composed of a computer that includes a memory 81 and a CPU 82. The programs and tables for the I/O change process described in the first embodiment are stored in the memory 81. The connection between the nodes 83 and the I/O management device 80 and the connection between the I/O interfaces 14 and the I/O management device 80 are simply shown in FIG. 20. However, it will be understood by those skilled in the art that I/O interfaces are needed for the connections. Since the I/O management device 80 connects the nodes 83 and the I/O interfaces 14 and executes the I/O change process described in the first embodiment, it may be called a computer with a connection switching (exchange) function. However, for example, an MMIO is not virtualized in the node 83 when the node 83 is a general computer (physical server). Therefore, the I/O mapping table 34 according to the first or second embodiment is not used, and an I/O access conversion process using the I/O mapping table 34 is not executed.

According to this embodiment, the I/O change process according to the first embodiment can be applied to a computing system having high flexibility in structure in which the I/O management device 80 is independently provided. Therefore, it is possible to change the configuration of the I/O interface used by a server while continuously performing the process of the server. As a result, it is possible to reduce the influence of the I/O change on tasks performed by a computing system.

What is claimed is:

1. A computing system comprising:
    a first I/O interface associating with a server; and
    an I/O management unit coupled with the server and the first I/O interface, the I/O management unit including:
    an I/O buffer;
    an I/O mapping unit which stores an access request of the server to the first I/O interface in the I/O buffer in response to a change start request of the first I/O interface associated with the server to a second I/O interface to be associated with another server;
    an I/O changing unit which associates the second I/O interface with the another server; and
    an I/O synchronizing unit that converts the access request stored in the I/O buffer into an access request to the second I/O interface associated with the another server, in response to the completion of the association by the I/O changing unit, and executes the converted access request.

2. The computing system according to claim 1,
    wherein, if the I/O changing unit cannot associate the second I/O interface with the another server, the I/O synchronizing unit executes the access request stored in the I/O buffer to the first I/O interface.

3. The computing system according to claim 2,
    wherein the first I/O interface couples the server and the second I/O interface couples the another server with the same type of target apparatuses.

4. The computing system according to claim 3, further comprising:
    a virtualization unit managing the server,
    wherein the server and the another server are virtual servers.

5. The computing system according to claim 4,
    wherein the I/O management unit is included in the virtualization unit.

6. The computing system according to claim 3,
    wherein, the I/O changing unit changes an ID of the first I/O interface to an ID of the second I/O interface.

7. The computing system according to claim 6,
    wherein the ID is at least one of a WWN and a MAC address.

8. The computing system according to claim 2, further comprising:
    a management server which issues the change start request using information identifying the server and the another server and the first and second I/O interfaces as parameters.

9. The computing system according to claim 8,
    wherein the management server issues the change start request on the basis of any one of an instruction from a user, the detection of a high load of the first I/O interface, and the detection of trouble of the first I/O interface or a sign of the trouble.

10. An I/O management device coupled with a server, comprising:
    an I/O buffer;
    an I/O mapping unit which stores an access request of the server to a first I/O interface in the I/O buffer in response to a change start request of the first I/O interface associated with the server to a second I/O interface to be associated with another server;
    an I/O changing unit which associates the second I/O interface with the another server; and
    an I/O synchronizing unit which converts the access request stored in the I/O buffer into an access request to the second I/O interface associated with the another server, in response to the completion of the association by the I/O changing unit, and executes the converted access request.

11. The I/O management device according to claim 10,
    wherein, if the I/O changing unit cannot associate the second I/O interface with the another server, the I/O synchronizing unit executes the access request stored in the I/O buffer to the first I/O interface.

12. The I/O management device according to claim 11,
    wherein the first I/O interface couples the server and the second I/O interface couples the another server with the same type of target apparatuses.

13. The I/O management device according to claim 12, wherein, the I/O changing unit changes an ID of the first I/O interface to an ID of the second I/O interface.

14. The I/O management device according to claim 13, wherein the ID is at least one of a WWN and a MAC address.

15. The I/O management device according to claim 11, wherein the I/O management device receives from an external management server the change start request, using information identifying the server and the another server and the first and second I/O interfaces as parameters.

16. A method of changing the I/O configuration of a computing system using an I/O management unit that has an I/O buffer and changes a first I/O interface associated with a server to a second I/O interface to be associated with another server, the method comprising:
   storing an access request of the server to the first I/O interface in the I/O buffer in response to a change start request of the first I/O interface associated with the server to the second I/O interface to be associated with another server;
   associating the second I/O interface with the another server;
   converting the access request stored in the I/O buffer into an access request to the second I/O interface associated with the another server, in response to the completion of the association; and
   executing the converted access request.

17. The method of changing the I/O configuration of a computing system according to claim 16,
   wherein, if the association between the another server and the second I/O interface is unavailable, the access request to the first I/O interface associated with the server, which is stored in the I/O buffer, is executed.

18. The method of changing the I/O configuration of a computing system according to claim 17,
   wherein the server and the another server are virtual servers, and
   the I/O management unit manages the execution of the access request from the virtual server and the another virtual server to the first and second I/O interfaces.

19. The method of changing the I/O configuration of a computing system according to claim 17,
   wherein the first I/O interface couples the server and the second I/O interface couples the another server with the same type of target apparatuses.

20. The computing system according to claim 19, further comprising:
   changing an ID of the first I/O interface to an ID of the second I/O interface.

* * * * *